June 9, 1959  R. H. VAN NOTE  2,889,927
PROCESS FOR CLARIFYING A LIQUID AND MULTITRAY APPARATUS THEREFOR
Filed April 29, 1955  2 Sheets-Sheet 1

Fig. I.

INVENTOR.
Robert H. Van Note
BY George H. Hopkins
ATTORNEY

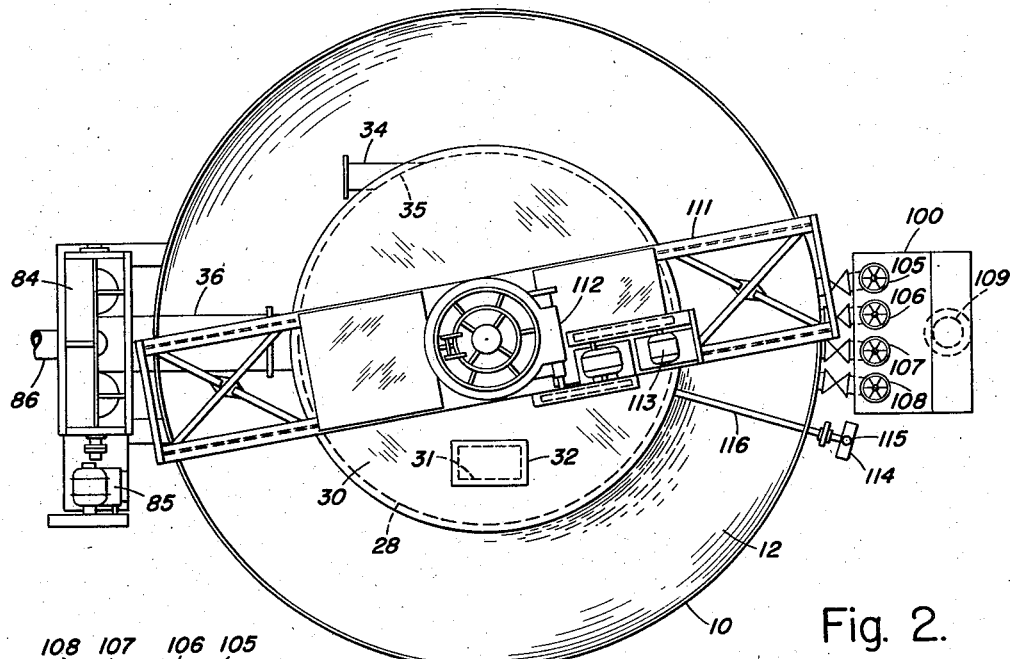
Fig. 2.
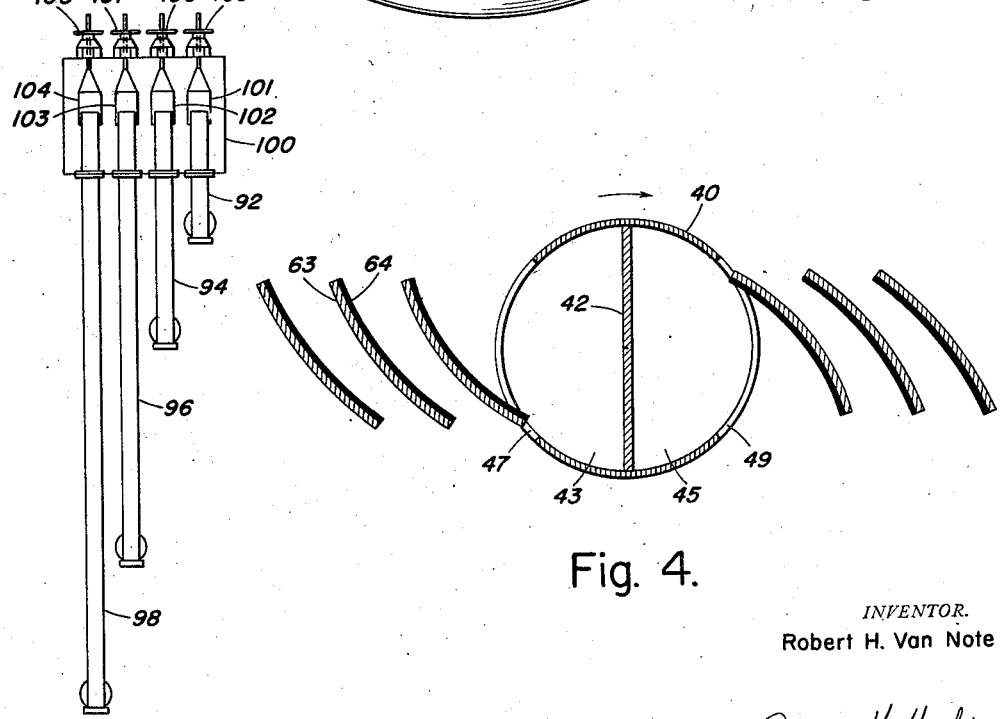
Fig. 3.
Fig. 4.
INVENTOR.
Robert H. Van Note
BY George H. Hopkins
ATTORNEY

United States Patent Office 2,889,927
Patented June 9, 1959

2,889,927

PROCESS FOR CLARIFYING A LIQUID AND MULTITRAY APPARATUS THEREFOR

Robert H. Van Note, Westport, Conn., assignor to Dorr-Oliver Incorporated, Stamford, Conn., a corporation of Delaware Application April 29, 1955, Serial No. 504,910

7 Claims. (Cl. 210—73)

This invention relates to an improved multitray clarifier. More particularly it involves an improvement in the ways and means of introducing feed into the settling compartments of said apparatus.

Multitray clarifiers are especially useful for the separation of suspended solids from liquids to obtain said liquids in a clarified condition while obtaining said solids as a sludge or mud of high solids concentration. This apparatus has been particularly useful in sedimentation procedures employed in the production of sugar from sugar cane, sugar beets and the like. While the apparatus is useful in other fields, it is in the sugar production environment that the development of the multitray clarifier art has received its greatest impetus. Consequently, I shall describe my invention with reference to the treatment of raw sugar juices, but with a recognition of the fact that the apparatus of this invention is not limited to the treatment of this particular type of suspension.

In general, the militray clarifier has developed into a tank sub-divided by generally horizontal, superposed trays or partitions into an upper feed receiving compartment, a bottom clarification and thickening compartment, and a number of intermediate clarification compartments. Means are provided for introducing heated, raw sugar juice into the feed compartment. Flocculation-agitation means are also provided within that compartment. Because foam and scum in the feed appear on the top surface of the body of juice in that compartment means are provided for removing the same. Said compartment also comprises means for removing the flocculated raw juice therefrom and delivering it to each of the lower compartments. At an upper level in each of the clarification compartments and of the clarification and thickening compartment means are provided for withdrawing, as overflow, clarified juice therefrom while means are provided in each of the compartments for collecting sedimented solids and transferring the same into said bottom clarification and thickening compartment wherein means are provided for collecting and discharging from the apparatus as underflow the resultant sludge or mud formed by such solids. Said means for collecting said solids and mud usually comprise moveable mud raking means for non-roilingly impelling sedimented solids towards and into the mud transfer and discharge means.

A standard type of multitray clarifier, which has received wide commercial acceptance, is disclosed in U.S. patent, No. 2,253,878 to W. C. Weber. However, the performance of this unit has not always measured up to expectations, wherefore studies have been undertaken to ascertain the underlying principles of clarification in tray clarifiers and to find ways and means of improving on this standard type of process equipment. Out of these studies there has emerged a number of significant observations.

It is a purpose of any tray clarifier to separate the feed suspension into two components: an overflow of maximum clarity, and an underflow, a thickened mud, of maximum solids concentration. Moreover, in sugar production, this separation, that is, clarification, must be completed during the shortest period of time possible in order to minimize sugar losses by inversion.

Actually clarification has three separate phases, to wit: initial separation, final clarification, and final thickening. The rate at which each phase proceeds and the degree to which each phase can be carried are dependent upon the composition of the raw juice and upon the treatment given the raw juice prior to clarification. These variables embody such factors as the type of cane being ground, the method of harvesting, the Brix of solution, the pH of solution, and the temperature of the raw juice. These conditions vary greatly among mills and, over a period of time, will vary even in the same mill. The performance and capacity of a tray clarifier will accordingly vary.

Regardless of those variations, however, the initial separation phase produces two distinct suspensions, a supernatent liquor containing less rapidly settleable solids in non-flocculated and in incompletely flocculated condition, and a thin mud comprising more rapidly settleable solids and flocs of less rapidly settleable solids. Furthermore, the rate of initial separation, that is, the rate of initial subsidence of the more rapidly settleable solids and flocs, determines the maximum upward linear rate at which the contents of a tray clarifier may be displaced, that is, the maximum overflow rate, because at a higher rate said solids and flocs thereof would be prevented from settling. Thus, the capacity of a tray clarifier is interdependent upon three variables, thickening area, overflow rate, and detention time. Singularly, each can limit the juice handling capacity unless the tray clarifier is designed to provide a balance among these variables.

It is a general object of this invention, therefore, to develop a multitray clarifier having a capacity greater than that heretofore obtainable at higher overflow rates than heretofore used while still obtaining an overflow of acceptable clarity and an underflow of mud at an acceptably high solids concentration.

It is another object of this invention to develop a multitray clarifier wherein the feed entering each settling compartment enters at equal velocities. In addition, it is an object of this invention to enable increased overflow rates to be used by starting flocculation of the flocculatable solids within the feedwells of each compartment, and thereby decreasing the time for complete flocculation to occur.

More specifically, it is an object of this invention to improve the aforementioned commercial embodiment of the multitray clarifier basic design to provide not only for equal distribution of the feed stream at equal velocities to each of the settling compartments but also to provide for an equal distribution of solids to each set of compartments.

Still another object is to provide a multitray clarifier with feed means for each set of compartments whereby completely flocculated solids and rapidly settleable individual solids within the feed to each set can immediately plunge into the subjacent clarification and thickening compartment and enter into the final thickening phase.

These objects along with any other object which may appear as this specification proceeds, are attained by this invention.

The multitray clarifier of this invention basically comprises an upright cylindrical tank with at least one set of superposed compartments, the upper compartment functionable as a clarification compartment and the subjacent compartment functionable as a clarification and a thickening compartment said compartments being divided by an inverted cone shaped tray having an opening at the apex thereof surrounded by a feedwell extending downwardly into the clarification and thickening compartment for a distance adequate to insure a sufficient detention time of liquid within that compartment for substantially completing the final clarification phase. Superposed above said clarification compartment is a coaxially located upright, cylindrical feed compartment having an inverted cone shaped bottom and provided with means for tangentially introducing feed thereinto at the periphery thereof and with means for removing foam and scum from the liquid surface of the feed compartment contents under operative conditions. Centrally disposed through the feed compartment through an opening at the apex of the bottom tray thereof and through the feedwell of said set of compartments is a rotatable, hollow, upright, cylindrical shaft to which are attached raking means for inwardly raking mud in each compartment adjacent the bottoms thereof to the center thereof and means for rotating said shaft at a speed selected to cause said mud to be nonroilingly raked inwardly. More particularly, said shaft is provided with an inlet port within the feed compartment at the bottom thereof and an outlet port within said feedwell whereby liquid and solids are delivered through said shaft from the feed compartment into the feedwell. At the bottom of said clarification and thickening compartment means are provided for receiving the raked mud and removing the same therefrom while at an upper level in each compartment means are provided for removing clarified liquid therefrom, said means being associated with means for equalizing the rates of withdrawal of clarified liquid from said compartment.

Under operative conditions feed delivered into the feedwell divides with liquid and less rapidly settleable solids in unflocculated and incompletely flocculated form passing into the upper flocculation compartment and the remainder of the liquid and solids passing into the subjacent clarification and thickening compartment. In both compartments unflocculated solids flocculate and incompletely flocculated solids become completely flocculated whereby said solids subside to the bottoms thereof to be raked inwardly. Settled solids on the bottom of the upper clarification compartment are raked as a thin mud into the feedwell whereby the solids concentration within the feedwell is increased. This increase of solids concentration in addition to the fact that feed stream plunging down from a center tube set up "rollers" which make a complete circle in the vertical plane increases the rate of flocculation of less rapidly settleable solids whereby rate of final clarification is increased.

In the preferred embodiment of the multitray clarifier of this invention, said tank comprises at least two superposed sets of compartments separated from each other by a seal, each set comprising an upper clarification compartment and a subjacent clarification and thickening compartment; a feed compartment functioning as a feed reservoir for the apparatus as well as to remove the foam and scum, and to disperse the entering feed stream; and feed transfer means which function to deliver feed from the feed compartment to each set of compartments while providing for an even split of juice and solids to each of the two sets of compartments. In addition, the feed means cooperate with said feed compartment to prevent the introduction of scum and foam into the compartments of the machine. Both of these factors are critical in obtaining the maximum capacity and optimum clarity of overflow.

In somewhat more detail, the feed means of the preferred multitray clarifier embodiment of this invention comprises a hollow tube, which preferably also functions as the central shaft of the machine, which tube is divided diametrically into two equal segments, each segment containing an entrance port at a level of the bottom of the feed compartment and an exit port inside a corresponding feedwell of one of the sets of the settling compartments. Both inlet and exit ports should have at least the same areas as the cross section of each segment. One segment functions as a feed transfer conduit for feed to the upper set of compartments while the other conduit segment functions as a feed transfer conduit for delivering feed to the lower set of compartments.

This multitray clarifier is characterized by two feedwells. Each feedwell is common to a clarification compartment and a clarification and thickening compartment. Each feedwell extends from the tray of the clarification compartment down into the thickening compartment for a distance adequate to insure sufficient detention time of the liquid in that compartment for the final clarification phase to be substantially completed. Thus, feed upon being discharged from the exit port of a feed transfer conduit enters the feedwell and then flows partly up into the clarification compartment and partly down into the clarification and thickening compartment. By controlling the rate of overflow from each compartment the amount of feed delivered into each compartment is also controlled. Such regulation of the overflow can be done by conventional means which, for example, regulate the overflow level at which clarified juice leaves the machine.

The feedwell design of the multitray clarifier of this invention is in direct contradiction of the basic design principle of the former design of multitray clarifiers.

In that design mud boots were provided to prevent solids deposited on the upper trays from being dedispersed with incoming feed while being transferred into the thickening compartment. With these means it was felt that capacities might be increased substantially in that each tray would provide an area for thickening. Tests have indicated, however, that only a small fraction of the total solids settled on the trays of the clarification compartment and that the solids concentration of liquor passing through the mud boots seldom exceeds that of the feed suspension. Thus, the boots do not serve the purpose for which they were intended and the capacity of that multitray clarifier unit is no greater than that of the older type units.

Present theories of flocculation indicate that the rate at which particles floc together or coalesce is a function of particle concentration. Thus, an increase in local solids concentration at a point of feed introduction in the multitray clarifier will therefore reduce the time required for coalescence of unflocculated and incompletely flocculated particles. Therefore, in this invention, solids deposited on the tray of each clarification compartment are raked into the feedwell and redispersed with feed in order to speed up the process of flocculation.

Thus, feedwells of this invention serve not only as a partially baffled volume in which the initial energy of the incoming feed stream may be dissipated but also as a flocculation compartment. Indeed, the "rollers" set up in the feedwells by the incoming feed provide flocculation-agitation conditions. This is of an advantage in that the comparatively larger sized upper flocculation compartment in prior designs may be eliminated to thereby reduce tank volume.

As noted earlier in the specification floc particles probably rupture in passing from the flocculation to the settling compartment. In the feedwells of this invention particles will have less chance to rupture as they pass into the relatively quiet zones of the settling compartment immediately after being formed.

Before referring to the drawings accompanying this application it should be noted that as this invention may be embodied in several forms without departing from the spirit or essential characteristics thereof, the embodiment to be described hereinafter is therefore illustrative and not restrictive, because the scope of the invention is defined by the appended claims rather than by the description preceding them, and all changes that fall within the metes and bounds of the claims, or forms that are their functional as well as conjointly cooperative equivalents, are therefore intended to be embraced by those claims.

Turning now to the drawings, it will be observed that

Figure 2 is a plan view of the whole apparatus of Figure 1 taken along the lines 2—2 of Figure 1;

Figures 3 is a cut-away sectional view of the overflow control means taken along the line 3—3 of Figure 1;

Figure 4 is a top view taken along the line 4—4 of Figure 1.

Figure 1:
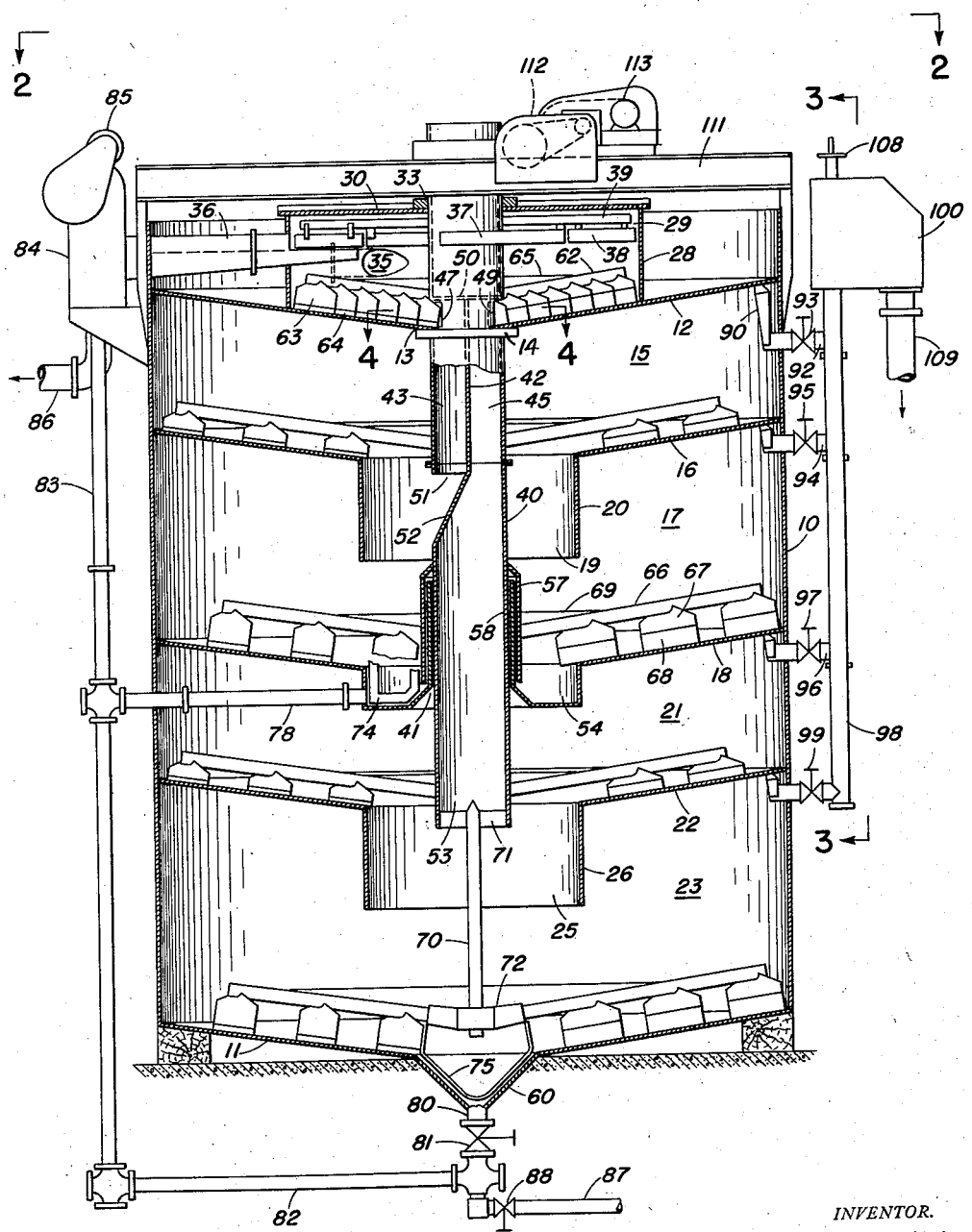
Figure 1 is a cut-away sectional view of a preferred embodiment of this invention.

In somewhat more detail, referring to the drawings, it will be observed that there is illustrated a preferred embodiment of the multitray clarifier of this invention. The multitray clarifier apparatus shown comprises an upright cylindrical tank 10 having an inverted cone shaped bottom 11 and an inverted cone shaped top 12 at the apex of which there is a centrally disposed opening 13.

Tank 10 is horizontally divided into an upper set and a lower set of compartments, the upper set of compartments comprising an upper clarification compartment 15 separated, at the bottom thereof, by an inverted cone shaped tray 16 from a subjacent clarification and thickening compartment 17 which has an inverted cone shaped bottom or tray 18. The upper clarification compartment 15 and the upper clarification and thickening compartment 17 are in hydraulic communication with one another at the apex of the tray 16 by a doughnut shaped passageway 19 surrounded by a cylindrical baffle or feedwell 20 which extends downwardly into the upper clarification and thickening compartment 17 from the tray 16.

Said lower set of compartments comprises a lower clarification compartment 21 separated, at the bottom thereof, by an inverted cone shaped tray 22 from a subjacent clarification and thickening compartment 23 the bottom of which is the tank bottom 11. The two lower compartments are in hydraulic communication with one another at the apex of the tray 22 by a centrally disposed passageway 25 surrounded by a cylindrical baffle or feedwell 26 extending from the inverted cone shaped tray 22 into the lower clarification and thickening compartment 23 and preferably having substantially the same inside diameter as the upper feedwell 20.

Arranged on top of the tank is an upright cylindrical shell 28 which, with the inverted cone shaped tank top 12 forms a feed compartment 29. Feed compartment 29 is provided with a round end closure member 30, at one side of which there is disposed a manhole 31 for access to the feed compartment interior, which is normally covered by a removable cover 32. The end closure member 30 also comprises a central opening 33 coaxially aligned with the central opening through the tank top 12.

Tangentially disposed to the vertical cylindrical shell 28 is a feed pipe 34 having an outlet 35 in the feed compartment 29 for the introduction of feed into said feed compartment at the periphery thereof.

An opening is also provided in the side of the feed compartment 29 to accommodate a foam canal 36, one end of which is located in said compartment. Said foam canal is actually a conduit and as shown in Figure 1 has a gradually decreasing radius toward the feed compartment. The end inside the feed compartment is in the form of an open top trough with an overflow edge arranged to be at or slightly above the normal operative liquid level of the feed compartment 29. The purpose of foam canal 36 is to receive collected foam and scum at the surface of the feed compartment contents and to remove the same from this compartment.

To collect scum and foam at the surface of the feed compartment contents an upright curved foam blade 37 is provided for impelling floating scum and foam at the surface towards the feed compartment periphery. At the periphery, that is, at the cylindrical wall 28, there is provided a skimmer blade 38, which is movable about a horizontal axis, to skim foam and scum into a foam canal. Said foam blade and said skimmer blade are each attached to a radially extending horizontal skimmer arm 39 which travels in the horizontal plane about the vertical axis of the machine.

Vertically disposed, in conjunction with a hydraulic seal ring 14, through the central opening 13 in tank top 12 and through the central openings 33 in the feed compartment end closure member 30 is a cylindrical, rotatable, hollow shaft 40 which also extends through a central shaft opening 41 disposed at the apex of tray 18 and through the feedwells 20 and 26. Said hollow shaft 40 is characterized by an interior partition plate 42 extending along the vertical axis downwardly from a level above the bottom of said feed compartment and arranged to diametrically divide the space inside said shaft into two semi-cylinders of equal cross-sectional area whereby there is provided a feed transfer conduit 43 and a feed transfer conduit 45.

Feed transfer conduit 43 communicates with the feed compartment 29 by means of a feed port opening 47 formed in the wall of the central shaft 40 at the bottom of feed compartment 29. Similarly, feed transfer conduit 45 is in communication with the feed compartment by means of a feed port opening 49 formed in the wall of said shaft 40 at the bottom of the feed compartment 29 and generally opposite to the other feed port opening 47, with an area at least substantially equal to the area of the other opening. The area of each port should at least be equal to the cross-sectional area of the corresponding feed transfer conduit.

At the upper end of partition plate 42 which is at the uppermost level of the feed port openings 47 and 49 a circular end closure plate 50 is provided which seals-off the upper portion of the central hollow shaft from the feed transfer conduits and thereby cause feed from the feed compartment to be delivered through the feed transfer conduits without any dead flow areas therein.

Feed transfer conduit 43 extends down through the central shaft 40 to the feedwell 20 between the upper clarification compartment 15 and the upper clarification and thickening compartment 17. Inside the feedwell there is an outlet 51 in the cylindrical wall of central shaft 40 with an area at least as great as the cross-sectional area of the feed transfer conduit 43. The partition plate 42 terminates at a level of said opening 51 with a baffle plate member 52 extending therefrom in sealing relationship to the interior of the central shaft to the lower level of said outlet to compel all of the feed in feed transfer conduit 43 to be delivered into the passageway 19 formed between the feedwell 20 and the central shaft 40. By locating the baffle plate 52 at an inclined position certain operational advantages are achieved which will be more fully described hereinafter.

The feed transfer conduit 45 terminates in an outlet 53 at the end of the central shaft 40 which outlet has an area at least as great as the cross-sectional area of said conduit, which outlet is situated inside the feedwell 26 whereby feed transfer conduit 45 functions to transfer feed from feed compartment 29 into the passageway 25.

Arranged about the central shaft as a part of the tray 18 is a downwardly extending, radial trench or mud boot 54 wherein mud on the surface of tray 18 is collected for removal.

In this embodiment, there must be no transfer of solids and liquids from the upper clarification and thickening compartment 17 to the lower clarification compartment 21. On the other hand, the central shaft 40 must be free to rotate on its vertical axis. Consequently, a mud seal 41 is provided which comprises a downwardly extending cylinder 57 attached at its upper end to the shaft 40, but spacedly set apart from said shaft to accommodate in close relationship between said cylinder and said shaft an upwardly extending cylinder 58 which is a continuation of the inside wall of the mud boot 54. From a hydraulic point of view this structural arrangement provides an effective hydraulic seal which blocks the passage of mud and juice from the upper compartment 17 to the subjacent clarification compartment 21.

Disposed at the apex of the conically shaped tank bottom 11 is an inverted discharge cone 60 wherein mud in the lower compartment 23 is collected for removal.

Under operative conditions there may be a substantial quantity of solids and flocs that are rapidly settleable and which will settle out in the feed compartment 29. Accordingly, feed compartment 29 is provided with a radially extending, horizontally disposed scraper arm 62 attached to the central shaft and which carries scraper blades 63 transversely arranged for inward raking, each of which has a squeegee 64 on the leading face thereof, the lower end of which is adjacent the bottom of the feed compartment and which functions to inwardly rake settled solids toward the center of the apparatus. Preferably, a support rod 65 from said scraper arm 62 to the central shaft 40 is provided to lend structural support to said arm. Each of the clarification compartments and the clarification and thickening compartments are also provided with means for inwardly raking mud formed by solids deposited on the bottom thereof toward the center of the machine, which means comprise a horizontally disposed radially extending scraper arm 66 to which are attached downwardly extending scraper blades 67 transversely arranged for inward raking, each of which has on its leading face a squeegee 68 with the lower edge thereof adjacent to the bottom of the compartment.

In the upper set of compartments and in the lower clarification compartment 21 said scraper arms are attached to the central rotatable shaft 40, and, to lend structural strength to the arm, tie rods 69 are provided between said arms and said shaft. In the lower clarification and thickening compartment 23 a central rake shaft 70 is provided which is attached at its upper end to said central feed shaft 40 by means of a spider 71 in the feed transfer conduit outlet 53. The lower end of said rake shaft is attached by means of a spider 72 to said scraper arm 66.

To assure the complete removal of raked and collected solids accumulated in the mud boot 54, a moveable scraper blade 74 is provided therein which is connected to said scraper arm 66 in the upper clarification and thickening compartment 17.

For the same reason, a moveable scraper blade 75 is provided in discharge cone 60 which blade is attached to said outwardly extending scraper arm 66 of said lower clarification and thickening compartment 23.

Mud collected in the mud boot 54 is removed therefrom by means of a horizontally disposed mud discharge conduit 78 connected to said boot and extending to and through the cylindrical shell 10.

Mud impelled into the discharge cone 60 is removed therefrom through a mud discharge conduit 80 disposed at the apex of said cone and provided with a shut-off valve 81. Said mud discharge conduit 80 is connected to a mud collection conduit section 82 which leads radially outwardly in a horizontal direction and thence upwardly to mud collection conduit 83 to which is also attached mud discharge conduit 78. Said mud collection conduit 83 passes upwardly to a conventional mud or sludge pump 84 arranged on a supporting structure attached to the tank shell 10. Said mud pump is also associated with the foam canal 36. Said mud pump 84 is driven by a conventional mud pump motor and gear unit 85. Mud and foam sucked into said mud pump 84 is discharged therefrom through pump discharge conduit 86.

Also provided with respect to the mud discharge conduit 80 is a mud liquidating conduit 87 with a shut-off valve 88 to enable the apparatus to be drained of liquid and solids when shutting down the apparatus.

Disposed in each clarification compartment and in the clarification zone of each clarification and thickening compartment at the outer periphery thereof and at an upper level therein there will be observed overflow discharge means which comprise in each case an overflow baffle or trough 90. Associated with each overflow baffle or trough is an overflow conduit provided with an exterior shut-off valve, the overflow conduits being identified in the drawing by the numerals 92, 94, 96 and 98 and the corresponding exterior shut-off valves being identified by the numerals 93, 95, 97, and 99.

Each of the overflow conduits just described lead outwardly from the respective compartments and then upwardly into an overflow control box 100 wherein the outlets of said conduits are provided with adjustable sleeves 101, 102, 103 and 104, with handwheel means, for example, for adjusting the upper levels of said sleeves, said means being identified by the numerals 105, 106, 107 and 108. By adjustment of the individual handwheels the overflow level of each of the compartments with respect to the level of feed in the feed compartment 29, and thus the rate of overflow, may be controlled. Clarified juice is permitted to spill over the adjustable sleeves into the box and consequently said box is provided with a conduit 109 for discharging the combined overflow in a single stream.

Situated on top of the tank is a platform support structure 111 on which are located the drive mechanism 112 for turning the central rotatable shaft 40 and a drive motor 113 for actuating said drive mechanism. The gear ratios in the drive mechanism are selected in accordance with conventional practice to give a rotational speed of the center shaft 40 whereat the rake arms and blades will non-rollingly impel mud towards the center of the apparatus in each compartment.

Also shown in Figure 2 is a vent box 114 having a vent 115 therein which is connected by means of vent piping 116 to the uppermost level of clarification compartment 15 and by other vent piping, not shown, to the uppermost levels of the other clarification compartment and the clarification and thickening compartments of said apparatus. Said vent box is disposed at about the level of the raw juice in the feed compartment. The purpose of the vent box and associated piping is to permit the escape of air entrapped in the compartments during initial start-up operations and to evacuate steam which might evolve during the operation of the apparatus.

To start up the multitray clarifier shown in the drawings, and with reference to the clarification of sugar cane juice, as an example, the machine is filled with raw sugar cane juice by introducing the same into the feed compartment 29 through feed pipe 34. Valves 93, 95, 97 and 99 are in shut-off condition to prevent juice from being remove through overflow conduits 92, 94, 96, and 98. Similarly, valve 81 on mud discharge conduit 80 is in shut-off condition and the mud pump 84 is not in operation. The reason for the shut-off condition of the various valves and the mud pump is to enable the compartments to be filled to capacity and to force out through the vent piping 116 and the other vent piping entrapped gas and foam. When all of the gas and foam has been removed from the compartment as will be evidenced by a continuous flow of juice through the vent piping, the overflow conduit shut-off valves 93, 95, 97 and 99 are opened and the adjustable sleeves 101, 102, 103 and 104 are adjusted by the adjusting means 105, 106, 107 and 108 to provide equal overflow rates from each of said compartments, which rates are selected to enable the initial separation phase to proceed at an optimum rate. Mud pump 84 is then started up and the shut-off valve 81 on mud discharge conduit 80 is opened with the valve 88 on mud liquidating conduit 87 in shut-off position.

The drive mechanism 112 is then placed into operation in order that the central feedshaft 40 may rotate and thereby cause settled solids on the bottom of the feed compartment 29 and the trays 16, 18, 22 and the bottom 11 to be non-roilingly raked inwardly.

This operation also permits the foam and gas floating on the surface of the raw juice in the feed compartment 29 to be skimmed therefrom into foam canal 36 and flow into the mud pump 84 for discharge with the mud.

Under operative conditions the raw juice introduced through the feed inlet 35 into feed compartment 29 tends to flow as a stream about the periphery of said feed compartment, but the stream effect or velocity effect is dissipated in flowing from said periphery towards the revolving feed ports 47 and 49. Some of the more rapidly settleable solids suspended in said raw cane juice deposit on the bottom of said feed compartment and are raked inwardly by means of the rotating scraper means therein towards and into the feed ports 47 and 49. Liquid also flows into said ports and passes through the feed transfer tubes 43 and 45 into the respective feedwells 20 and 26.

Thus, a continuous flow of liquid and solids will occur from the feed compartment 29 through the feed transfer conduits 43 and 45 and out through the feed port outlet 51 into the passageway 19 of feedwell 20. Similarly, there will be a continuous flow of liquid and solids through the feed transfer tube 45 from the feed compartment 29 of the passageway 25 of feedwell 26. Not only will the flows be at an equal flow rate to each compartment beneath the feed compartment, because of the initial setting and regulation of the adjustable sleeves in the overflow discharge control box 100, but also, and more importantly, the flow rate of solids to each set of compartments will be equal.

In each of the feedwells the flow of raw juice divides with a portion thereof passing into the clarification compartment and a portion thereof passing into the subjacent clarification and thickening compartments. It is important to note, however, that the liquid and solids flowing into each of the clarification compartments will be substantially free from rapidly settleable solids and completely formed flocs of less rapidly settleable solids. These rapidly settleable solids and completely formed flocs of less rapidly settleable solids upon passing through the outlet of the feed transfer conduits promptly settle out to the bottom of each clarification and thickening compartment. The remaining solids in the feedwells are those which are less rapidly settleable and which are present both individually and as incompletely formed flocs. However, solids and flocs thereof which have settled in the clarification compartment are raked non-roilingly into said feedwells by the rotating rake means located in each clarification compartment. This tends to increase the solids concentration within the passageways and thus tends to promote the flocculation therein of the less rapidly settleable solids and the formation of complete flocs.

In the upper feedwell 20, between the upper clarification compartment 15 and its subjacent clarification and thickening compartment 17, because of the impinging of the feed in the feed transfer conduit on the baffle plate member 52 there tends to be a flocculation-agitation condition created which further promotes flocculation and the formation of complete flocs within the passageway 19. In the lower feedwell 26 the plunging of feed through the outlet 53 sets up "rollers" which make a complete circle in the vertical, which effect likewise creates flocculation-agitation conditions.

Flocculation, however, is completed in the clarification compartments and in the clarification zone of each of the clarification and thickening compartments and the final clarification phase is completed by floc settlement with the settled flocs raked into the passageways from the clarification compartments and those formed in the clarification zone of the clarification and thickening compartments settling out into the thickening zone of the clarification and thickening compartments wherein the final thickening phase occurs to form mud of high solids concentration. During the flocculation, settling and thickening steps, liquid in each of the compartments continuously flows towards the overflow trough 90 at gentle velocities. By the time liquid reaches said troughs the final clarification phase has been completed so that the liquid emerging from the overflow conduits in overflow discharge control box 100 is at a maximum clarity. Meanwhile, mud in each of the thickening zones is impelled towards the mud boot 54 in compartment 17 and towards the discharge cone 60 in compartment 23. In the mud boot 54 and in the discharge cone 60 the collected mud is evacuated therefrom through the respective mud discharge conduits into mud collection conduit 83 and thereby into mud pump 84 wherein it is released into discharge conduit 86 to flow to filters and the like for final removal of residual juice, which juice, incidentally, may be returned to the feed being delivered to the multitray clarifier.

To shut down the machine of this invention, the introduction of feed through the feed pipe opening 35 is stopped, the mud pump 84 is shut off, and valve 88 is opened. In most instances, the mud liquidating conduit 87 will be attached to a pump which is then started up and the tank contents drained thereby.

In view of the observations referred to in the beginning of this specification the clarification compartment in each case is designed to have a depth to give sufficient detention time at a given flow rate of feed to the apparatus for the final clarification phase to substantially reach completion while the clarification and thickening compartment in each case is designed with an overall depth to provide for a lower thickening zone and an upper clarification zone, the depth of the clarification zone being the same as the depth of the clarification compartment, and the depth of the thickening zone being selected to provide sufficient detention time for the mud to pass substantially through the final thickening phase. The thickening area (cross-sectional area) in each set of compartments is selected to allow solids to subside through the solids concentration layer having the least solids handling capacity.

For any given application of the multitray clarifier of this invention settling rate tests will therefore have to be made to determine these design variables since the character of the feed solids will differ from case to case. However, in treating raw, cane sugar juice the following approximate dimensions can be used.

| | | |
|---|---|---|
| Inside diameter of each compartment | feet | 18 |
| Depth of clarification compartment (at periphery) | do | 4 |
| Depth of clarification and thickening compartment (at periphery) | feet | 6 |
| Inside diameter of feedwells | do | 6 |
| Outside diameter of central rotatable shaft | do | 2 |
| Inside diameter of feed compartment | do | 10 |
| Depth of feed compartment at periphery | do | 3 |
| Included angle of trays | degrees | 163 |

In an apparatus with these approximate dimensions the ratio of clarification area to thickening area will be of the order of 2:1 whereby the capacity thereof is tremendously increased over the prior art machines in obtaining an overflow of the same clarity and an underflow of the same solids concentration.

Indeed, an apparatus with substantially these dimensions and constructed according to the teachings herein has been placed into commercial use in a sugar cane factory alongside a multitray clarifier of the type disclosed in said U.S. Patent, No. 2,253,878 to W. C. Weber. The prior art apparatus was a five compartment machine, with the upper four compartments functioning as clarification compartments and the bottom compartment functioning as a clarification and a thickening compartment. Both the machine of this invention and the prior art machine had the same compartment diameters. The results tabulated in the following table were noted under varying grinding conditions.

|  | Muddy Cane | | Intermediate Cane | | Normal Cane [1] | |
|---|---|---|---|---|---|---|
| Average Feed Conc., Gms./Liter | 30.3 | | 26.5 | | 15.4 | |
| Grinding Rate, Tons/24 hrs | 1,650 | | 1,950 | | 1,900 | |
| Feed Rate, g.p.m | 245 | | 295 | | 300 | |
|  | Impvd. Machine | Prior Art Machine | Impvd. Machine | Prior Art Machine | Impvd. Machine | Prior Art Machine |
| Split of Flow (percent) | 60 | 40 | 60 | 40 | 65 | 35 |
| Tons of Solids/Day | 26.7 | 17.8 | 28.1 | 18.7 | 18.1 | 9.7 |
| Unit Area Ft.²/TS/Day | 19.1 | 14.4 | 18.2 | 13.7 | 28.2 | 26.3 |
| Ave. Mud Conc, Gms./liter | 232 | 205 | 167 | 160 | 173 | 163 |
| Clarity of Overflow, p.p.m | 1,000 | 1,000 | 100 | 100 | 100 | 100 |

[1] Average pH of mixed juice=6.8.

The notation—Unit area—ft.²/TS/day refers to the thickening area per ton of solids per day required by the incoming feed in order to complete the final thickening phase without loss of solids to the overflow to a mud having a solids concentration of 225 grams per liter From the above it will be noted that the machine of the invention received a greater rate of flow than the prior art machine. In spite of the higher rate of flow, and under even the most adverse of feed conditions, a juice of excellent clarity and a mud of higher solids concentration was obtained showing that the machine was in excellent hydraulic stability with equal rates of total flow to each set of compartments and with equal distribution of solids to each set of compartments. Furthermore, short-circuiting of foam and gas to the compartment was effectively blocked, indicating effective dissipation of the incoming feed stream in the feed compartment.

Although not shown in the drawings, it will be realized that in starting up and shutting down the machine of this invention it is preferred to have an external conduit with a shut off valve leading downwardly from mud discharge conduit 78 into the bottom clarification and thickening compartment 23. During start-ups and shut downs this valve is in open position so that liquid entering the upper clarification and thickening compartment 17 either in filling up the machine or in draining it will not cause the tray bottom 18 thereof to buckle when the liquid level in said lower clarification compartment 21 is below said tray bottom. During operation of the machine, with said compartments filled to capacity, the shut-off valve is in closed position to prevent the escape of clarified liquid into the mud collection conduit 83.

Also, for simplicity, I have shown only one mud collection conduit 82 which receives mud from both sets of compartments. It will be realized mud from both sets of compartments can be removed therefrom through two separate conduits into individual mud pumps and from there into a common discharge conduit which may also receive foam and scum from the foam canal 36.

I claim:

1. A multitray clarifier which comprises a cylindrical tank having a top and a bottom which tank is divided by means of vertically spaced substantially horizontally disposed trays having an opening at the center thereof into a plurality of superposed compartments; said compartments comprising an upper feed compartment and at least two subjacent superposed settling compartments, said settling compartments comprising an upper clarification compartment and a lower clarifying and thickening compartment; a cylindrical, open ended liquor transfer feedwell extending downwardly a significant distance from said opening of the tray at the bottom of said upper clarification compartment into said lower clarifying and thickening compartment; feed delivery means extending from said feed compartment in sealing relationship through the opening of the tray at the bottom of said feed compartment into said feedwell for delivering liquid and solids from said feed compartment into said feedwell and therefrom both upwardly into said upper clarification compartment and downwardly into said lower clarifying and thickening compartment; means for overflowing clarified liquid from each of said superposed settling compartments at an upper level adjacent the periphery thereof; means for controlling the rate of such overflow and thereby the rate of delivery of liquid and solids from said feed compartment into said feedwell and into each of said superposed settling compartments; means for non-roilingly impelling as mud settled solids of each of said superposed settling compartments toward the center opening of the bottom tray thereof; and means associated with the center opening in the tray at the bottom of said lower clarifying and thickening compartment for discharging settled mud therefrom.

2. A multitray clarifier according to claim 1 wherein said feed delivery means comprises a vertical, hollow feed transfer conduit with a feed inlet port located at the bottom of said feed compartment and with a feed outlet port opening downwardly and unobstructedly into said feedwell, at a point intermediate the top and the bottom of said feedwell.

3. A multitray clarifier which comprises a cylindrical tank having a top and a bottom and which is divided by means of vertically spaced substantially horizontally disposed trays into a plurality of superposed compartments each having an opening at the center thereof, into a feed compartment and at least two subjacently arranged sets of superposed settling compartments, the upper set comprising an upper clarification compartment, a subjacent clarification and thickening compartment and a cylindrical, open ended liquor transfer feedwell extending downwardly a significant distance from the opening of the bottom tray of said upper clarification compartment into said upper clarification and thickening compartment, and a lower set comprising a lower clarification compartment, a subjacent lower clarification and thickening compartment and a lower, cylindrical, open ended liquor transfer feedwell extending downwardly a significant distance from the opening of the bottom tray of said lower clarification compartment at the opening thereof into said lower clarification and thickening compartment; feed delivery means comprising a conduit extending from said feed compartment in sealing relationship through the opening of the tray bottom of said feed compartment and through the upper clarification compartment to discharge directly into said upper feedwell and therefrom into said upper clarification and thickening compartment and said upper clarification compartment, and a conduit extending from said feed compartment in sealing relationship through the opening of the tray bottom of said feed compartment and the subjacent upper clarification compartment and upper clarification and thickening compartment and said lower clarification compartment to discharge directly into said lower feedwell and therefrom into said lower clarification and thickening compartment and said lower clarification compartment, said conduits being adapted and arranged in normal operation of the clarifier to deliver feed liquor to the respective feedwells at equal volumes and equal flow rates; means for overflowing clarified liquid at an upper level at the periphery of each of said settling compartments, which means are associated with means for controlling the rates of such overflow and thereby the rates of feed delivery into each of said compartments; means for non-roilingly impelling settled solids as mud adjacent the bottom of each compartment towards the center thereof; means associated with the opening in the bottom tray of said upper clarification and thickening compartment which cooperate with said feed delivery means to hydraulically seal said compartment from said lower clarification compartment; means associated with said bottom trays of said upper and lower clarification and thickening compartments for withdrawing adjacent the center thereof mud impelled thereto.

4. A multitray clarifier according to claim 3 wherein said feed delivery means comprise a vertical central feed transfer conduit with a feed inlet port located at the bottom of said feed compartment with a feed outlet port in said upper feedwell; and a vertical, central feed transfer conduit with a feed inlet port oppositely located and facing oppositely from, said other feed inlet port, at the bottom of said feed compartment, and with a feed outlet port located within said lower feedwell.

5. A multitray clarifier according to claim 4 wherein the two conduits constituting said feed delivery means are constituted by a hollow rotatable shaft having a partition plate passing therein through the vertical axis thereof from a level in said feed compartment to a level in said upper feedwell to diametrically divide said shaft into two semi-cylindrical segments of equal cross-sectional area, a feed inlet port at the bottom of said feed compartment opening into one of said segments, an oppositely disposed, oppositely facing feed inlet port at the bottom of said feed compartment opening into said other segment, a closure plate at the end of said partition plate and above the level of said feed inlet ports, a feed outlet port opening uninterruptedly downward within said upper feedwell and opening into one of said segments and a feed outlet opening downwardly in said lower feedwell and opening into said other segment.

6. Continuous process for clarifying a liquor containing solids in suspension, comprising the steps of: establishing and maintaining a zone of higher solids concentration, said solids concentration in said zone being higher than the solids concentration of said liquor containing solids in suspension; introducing said liquor into said zone of higher solids concentration; flocculating at least a portion of said solids contained in said zone of higher solids concentration; passing a portion of the material contained in said zone of higher solids concentration, including less dense solids, generally upwardly into a zone of quiescence; separating solids from said liquor into said zone of quiescence by gravity sedimentation; returning said settled solids from said zone of quiescence to said zone of higher solids concentration; discharging a portion of the material contained in said zone of higher solids concentration, including heavier and flocculated solids, generally downwardly into a zone of solids densification; densifying solids introduced into said zone of densification by gravity means; removing densified solids from the lower portion of said zone of solids densification; removing clarified liquor from the upper portions of said zones of clarification and solids densification.

7. A multi-tray clarifier according to claim 1 in which at least two sets comprised of an upper clarification compartment and a lower clarification and thickening compartment are mounted superjacent each other.

References Cited in the file of this patent

UNITED STATES PATENTS

| | | |
|---|---|---|
| 1,336,553 | Darrow | Apr. 13, 1920 |
| 1,595,066 | Booth | Aug. 10, 1926 |
| 2,253,878 | Weber | Aug. 26, 1941 |
| 2,343,836 | Weber | Mar. 7, 1944 |
| 2,355,875 | Lasseter | Aug. 15, 1944 |
| 2,377,875 | Geissler | June 12, 1945 |
| 2,483,648 | Knight | Oct. 4, 1949 |
| 2,488,851 | Copp | Nov. 22, 1949 |